US012749897B2

(12) United States Patent
Shamma et al.

(10) Patent No.: US 12,749,897 B2
(45) Date of Patent: Sep. 29, 2026

(54) SMART V2H FOR GRID EMISSIONS REDUCTION AND EMERGENCY POWER DISTRIBUTION

(71) Applicant: TOYOTA RESEARCH INSTITUTE, INC., Los Altos, CA (US)

(72) Inventors: David A. Shamma, San Francisco, CA (US); Alexandre L.S. Filipowicz, Mountain View, CA (US); Keiichi Namikoshi, Los Altos, CA (US); Joey Li, San Francisco, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/773,356

(22) Filed: Jul. 15, 2024

(65) Prior Publication Data

US 2026/0018897 A1 Jan. 15, 2026

(51) Int. Cl.
*H02J 7/00* (2026.01)
*B60L 53/16* (2019.01)
(Continued)

(52) U.S. Cl.
CPC .............. *H02J 3/322* (2020.01); *B60L 53/16* (2019.02); *B60L 53/63* (2019.02); *B60L 55/00* (2019.02);
(Continued)

(58) Field of Classification Search
CPC ... H02J 3/322; H02J 3/003; H02J 3/14; B60L 53/16; B60L 53/63; B60L 55/00; B60L 2210/40
(Continued)

(56) References Cited

U.S. PATENT DOCUMENTS

2008/0040263 A1* 2/2008 Pollack .................. B60L 53/14 705/39
2011/0307109 A1* 12/2011 Sri-Jayantha .......... G06Q 10/04 700/291
(Continued)

FOREIGN PATENT DOCUMENTS

CN 109599856 4/2019
CN 115360804 11/2022
(Continued)

OTHER PUBLICATIONS

Narimani et al., "Demand Side Management for Homes in Smart Grids," North American Power Symposium (NAPS 2019), Oct. 2019, 6 pages (https://doi.org/10.1109/NAPS46351.2019.9000233).

*Primary Examiner* — Elim Ortiz
(74) *Attorney, Agent, or Firm* — SHEPPARD, MULLIN, RICHTER & HAMPTON LLP; Daniel N. Yannuzzi

(57) ABSTRACT

Systems and methods are provided for a carbon footprint aware V2H system that supplies power from a vehicle to a household based on a carbon footprint of an electrical transmission grid connected to the household. Examples herein electrically connect a vehicle power system to a household power system that is connected to an electrical transmission grid and characterize the carbon footprint of the electrical transmission grid. based on the characterization, electrical power from the vehicle power system can be supplied to the household power system. For example, when the carbon footprint satisfies certain criteria, the vehicle power system can be used to supply power to the household power system.

19 Claims, 7 Drawing Sheets

(51) Int. Cl.

| | |
|---|---|
| ***B60L 53/63*** | (2019.01) |
| ***B60L 55/00*** | (2019.01) |
| ***H02J 3/00*** | (2026.01) |
| ***H02J 3/14*** | (2026.01) |
| ***H02J 3/32*** | (2006.01) |

(52) U.S. Cl.
CPC ................ *H02J 3/003* (2020.01); *H02J 3/14* (2013.01); *B60L 2210/40* (2013.01)

(58) Field of Classification Search
USPC ........................................... 307/10.1, 9.1, 66
See application file for complete search history.

(56) References Cited

U.S. PATENT DOCUMENTS

| | | | |
|---|---|---|---|
| 2020/0161859 | A1 | 5/2020 | Bell |
| 2021/0061125 | A1 | 3/2021 | Nasr |
| 2023/0396064 | A1 | 12/2023 | Lee |

FOREIGN PATENT DOCUMENTS

| | | |
|---|---|---|
| CN | 115566669 | 1/2023 |
| CN | 115829275 | 3/2023 |
| CN | 115882485 | 3/2023 |
| IN | 359377 | 2/2021 |
| IN | 202341006025 | 2/2023 |
| JP | 2014007918 | 1/2014 |

* cited by examiner

SMART V2H FOR GRID EMISSIONS REDUCTION AND EMERGENCY POWER DISTRIBUTION

TECHNICAL FIELD

The present disclosure relates generally to systems and methods for transferring energy between a home and a vehicle, and, more particularly, some embodiments relate to carbon footprint aware vehicle-to-home (V2H) charging that routes energy from the vehicle to a connected home based on a carbon footprint of an electrical transmission grid.

DESCRIPTION OF RELATED ART

Network-equipped household appliances are becoming more prevalent in homes. Connected appliances allow for enhanced features and improved control. For example, remote access for activating and deactivating features and receiving operational status provide benefits to consumers. Electrical vehicle (EVs) are also becoming more widely available. EVs can be electrically connected to the same household power system as the household appliances. Through the electrical connection, a battery of an EV can be supply power to the household power system.

BRIEF SUMMARY OF THE DISCLOSURE

According to various embodiments of the disclosed technology, systems and methods for leveraging an electrified vehicle to supply electrical power to a home based on a carbon footprint of an electrical transmission grid connected to the home.

In accordance with some embodiments, a method is provided. The method comprises electrically connecting a vehicle power system to a household power system, the household power system being connected to an electrical transmission grid and characterizing a carbon footprint of the electrical transmission grid. The method also includes supplying electrical power from the vehicle power system to the household power system based on the characterization of the carbon footprint of the electrical transmission grid.

In another aspect, a vehicle-to-home electrical power distribution system is provided that comprises a memory storing instructions and one or more processors communicably coupled to the memory. The one or more processors are configured to execute the instructions to detect an electrical connection between vehicle power system of a vehicle and a household power system of a home, the household power system being connected to an electrical transmission grid; characterize a carbon footprint of the electrical transmission grid; and supply electrical power from the vehicle power system to the household power system based on the characterization of the carbon footprint of the electrical transmission grid.

In another aspect, a vehicle is provided. The vehicle includes one or more batteries configured to supply electrical power to one or more vehicle subsystems, a charge port configured to electrically couple to a charger and transfer electrical power from the charger to the one or more batteries, an inverter configured for bi-directional energy transfer between the one or more batteries and the one or more vehicle subsystems, and an electrical power distribution circuit. The electrical power distribution circuit comprises a processor configured to execute instructions stored in a memory to detect an electrical connection between the charger and the charge port, wherein the charger is connected to a home power network that draws power from an electrical transmission grid, obtain information indicative of an amount of power drawn by of the electrical transmission grid from non-renewable energy sources, and responsive to a determination that that amount of power drawn by of the electrical transmission grid from non-renewable energy sources exceeds a threshold amount, operate the inverter to transfer electrical energy from the one or more batteries to the charger via the charge port.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
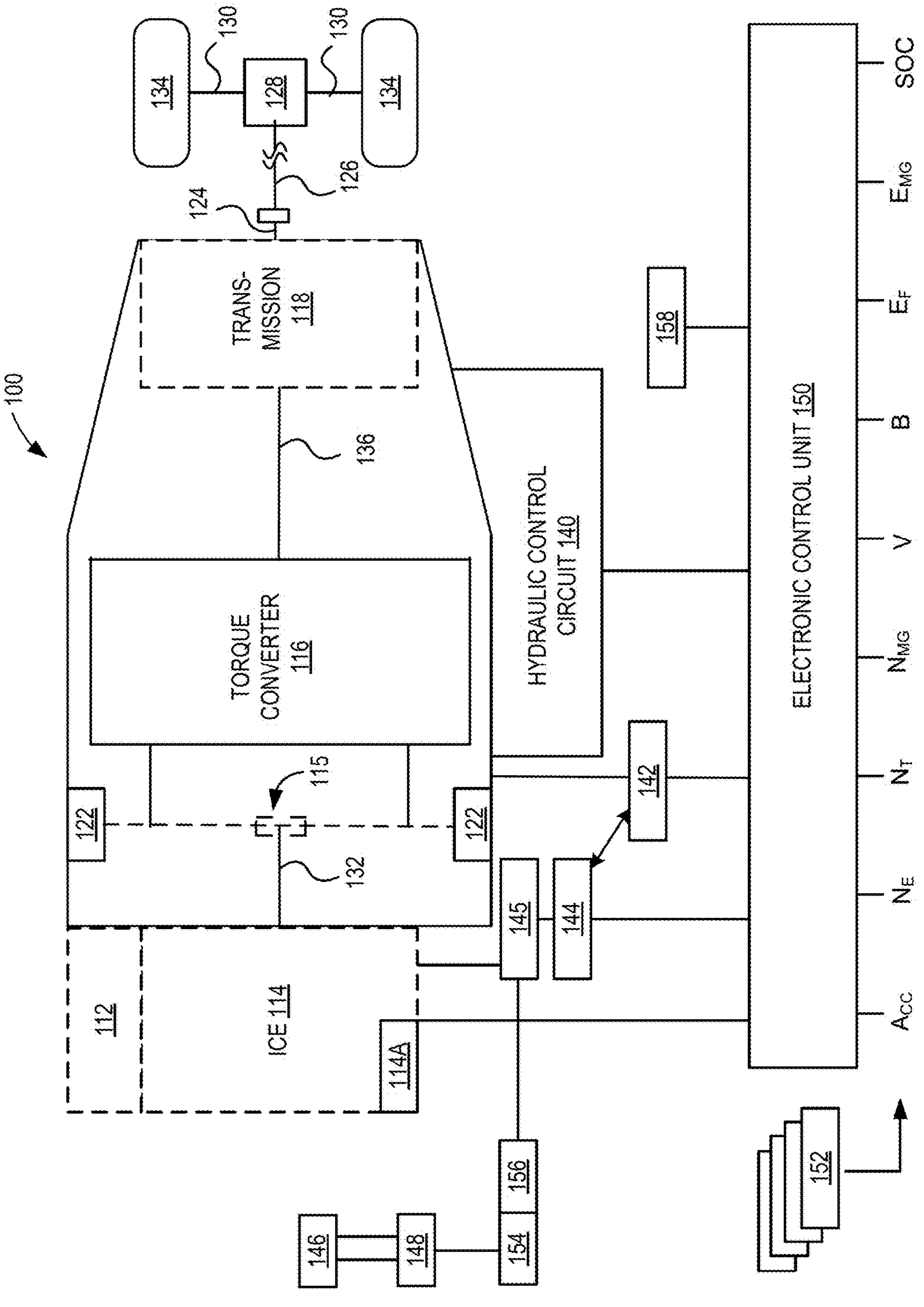
FIG. 1 is a schematic representation of an example electrified vehicle with which embodiments of the systems and methods disclosed herein may be implemented.

The figures are not exhaustive and do not limit the present disclosure to the precise form disclosed.

DETAILED DESCRIPTION

As alluded to above, EVs can be electrically connected to a household power system. Through this connection, a vehicle power system of the connected EV can be leveraged for supplying electrical power to the household power system for operating household energy consuming devices, such as household appliances, through Vehicle-to-Home (V2H) energy transfer operation mode that leverages bi-directional charging to transfer energy stored in a battery of the vehicle power system to the household power system. Using the electrical power stored in the battery, instead of energy from an electrical transmission grid, can help reduce the carbon footprint emitted by the grid, for example, carbon footprint emissions resulting the grid pulling from non-renewable resources.

Embodiments of the disclosed technology provide for a carbon footprint aware V2H system that can supply power from an EV to a household power system based on a characterization of the carbon ($CO_2$) footprint of an electrical transmission grid (also referred to herein as electrical grid or grid) that is connected to the household power system. For example, embodiments disclosed herein may obtain information indicative of the carbon footprint of the grid and characterize the carbon footprint based on the obtained information (also referred herein to as carbon footprint data). Using the characterization, examples herein can operate the EV to supply power to the household power system using the EV's vehicle power system responsive to the characterized carbon footprint satisfying certain criteria. If the characterized carbon footprint satisfies the criteria, for example, the characterization of the carbon footprint is above a carbon foot print threshold, the examples disclosed herein can leverage the connected EV to supply electrical power to the household power system.

Conventional V2H systems are agnostic to the carbon footprint of the grid itself, instead focusing on load balancing of the home. As such, conventional V2H systems are unaware of and unable to provide for or assist with reducing the overall carbon footprint of the connected grid. These systems are instead focused on managing the carbon footprint of the home through load balancing of household power consuming devices.

In examples, the information indicative of a carbon footprint of an electrical transmission grid can be obtained by various means. For example, information indicative of the carbon footprint may be obtained from source external to the home and EV, for example, from an electric utility company and/or from governmental agency (e.g., the U.S. Energy Information Administration (EIA) or the like). Examples herein may query application programming interface(s) (APIs) of these external sources (also referred to herein as external systems) to obtain the information. In some examples, the information indicative of a carbon footprint of the grid may comprise measured values (or indices) of the carbon footprint in terms of tonnes of emissions ($CO_2$-equivalent) per unit of comparison. The measure of the carbon footprint may be based on direct emission (e.g., carbon emissions emitted by the grid itself) and indirect emissions (e.g., emissions from sources upstream and downstream of the grid). Renewable and non-renewable energy sources may be examples of indirect emissions. In another example, the information may comprise a delineation of how much (e.g., percentage or other comparative value) power on the grid is sourced from non-renewable energy sources (e.g., oil, natural gas, coal, nuclear energy, and the like) and/or renewable energy sources (e.g., solar energy sources, wind energy sources, geothermal energy sources, hydropower sources, bioenergy, and the like).

In some examples, the information indicative of a carbon footprint of the grid may comprise a current, real-world information. By leveraging real-world, current information, examples disclosed herein can provide reactive carbon footprint reductions by leveraging the EV for supplying power responsive to increases in the measured values of the carbon footprint of the grid.

In another example, the information may include historical data that can be used to predict a future carbon footprint. For example, historical data can be applied to machine learning (ML) models trained to recognize patterns in the historical data and predict a footprint of the grid along a future time horizon. In this case, examples disclosed herein can provide proactive carbon footprint reductions by leverage the EV for supplying clean power to offset a predicted increase in the carbon footprint on the grid.

As noted above, information indicative of a carbon footprint of an electrical transmission grid can be obtained from external sources, such as utility companies, governing bodies, and the like. As an example, the EIA publishes information related to carbon emissions by the electric power industry. Similarly, utility companies may also publish such information. Examples herein may query APIs of these external sources to obtain the information and process the information to characterize a current and/or future carbon footprint of the grid.

Examples disclosed herein can provide for passive reductions in the carbon footprint pulled by the grid and/or directed reductions.

Passive reductions can be realized by leveraging the EV to supply power to the household power system when the characterization of the carbon footprint, either actual or predicted, exceeds a carbon footprint threshold. For example, the carbon footprint threshold may be defined as a threshold value of an acceptable value of the carbon footprint (either a real-world, current measured value or a predicted future value). In this case, embodiments disclosed herein may obtain information indicative of a carbon footprint from the external sources and characterize the carbon footprint by one or more of registering a current (e.g., most recent) measured value of the carbon footprint of the grid and/or predicting a future carbon footprint of the grid from historical data. If the characterized carbon footprint, provided as a measured or predicted value, exceeds the threshold value, examples herein can operate the vehicle power system of the EV to supply electrical power to the household power system. The threshold value may be set at any acceptable value of the carbon footprint as desired by an operator (e.g., a resident of the home or other use of the systems disclosed herein). In an example, the threshold may be zero (e.g., net zero greenhouse gases emitted by power sources souring the grid).

As another example, the carbon footprint threshold may be provided as a threshold amount of power on the grid (e.g., a percentage or other comparative value) that is sourced from non-renewable energy sources (and/or an amount sourced from renewable energy sources). In this case, embodiments disclosed herein may obtain the information indicative of a carbon footprint from the external sources and characterize the carbon footprint by one or more of registering a current (e.g., most recent) amount of power sourced by non-renewable energy sources (or an amount sourced from renewable energy sources) and/or predicting a amount from historical data. If the amount of power supplied by non-renewable energy sources exceeds the threshold amount (or the amount of power supplied by renewable energy is equal to or below the threshold amount), examples herein may operate the vehicle power system to supply electrical power to the household power system. The threshold amount may be set at any desired amount of power sourced by non-renewable or renewable power sources. In one example, if any power is sourced from non-renewable power sources, the vehicle power system may be triggered to supply electrical power. In another example, 50% may be used as a threshold. In some examples, the amount of electrical power supplied by the EV may be inversely proportional to the amount of power on the grid sourced from renewable power sources (e.g., as more power is sourced from renewable power sources and less from non-renewable power sources, less power is pulled from the EV).

Directed reductions in the carbon footprint can be obtained using the above described thresholding to trigger operation of the EV to supply power to the household power system in combination with directed routing of electrical power from the EV to a portion of the household power system. For example, a subset of household energy consuming devices may be prioritized for drawing electrical power from the EV over other household energy consuming devices. For example, electrical power supplied by the EV vehicle can be used to offset high power consuming devices, such as refrigerators, air conditioners (A/C), and so on, while low power consuming devices (e.g., light emitting diode (LED) lamps) can be powered by the grid. As an example implementation, power consumption metrics may be obtained, such as but not limited, current draw for a plurality of household energy consuming devices. The power consumption metrics can be compared to a metric threshold and electrical power from the EV can be routed to any household energy consuming devices having a current draw greater than the metric threshold.

In another example, household energy consuming devices can be prioritized according to an operation criticality for a given situation (e.g., emergency power outage, time of day, etc.). Examples herein may generate a prioritization list of household power consuming devices in a ranked order according to operation criticality. Examples herein can then select the top k ranked household power consuming devices, where k is an integer greater than 0, and label the selected devices as essential loads. The remaining household power consuming devices can be labeled as non-essential loads. The parameters for ranking each device may be input by a user and/or automated by the disclosed systems, and may be dependent on a given situation that may impact the availability of power from the grid (e.g., emergencies, power outages, high electricity costs, or other situations that may affect the supply of power from the grid to the home). The EV can then be operated to supply power to the essential loads, while non-essential devices can be powered by the grid or deactivated (e.g., turned off or otherwise operated to draw negligible power).

Examples herein may determine situations by characterizing conditions external to the home power system and EV from power consumption parameters. Power consumption parameters may include, but are not limited to, operating criticality of household power consuming devices (as described above), as well as electricity costs (static or dynamic costs, such as costs as a function of peak demand and/or time and costs as defined in an electricity plan associated with the home), current weather and/or weather forecast (e.g., temperatures, natural disasters, such as tornadoes and hurricanes, etc.), status of the grid (e.g., power load or usage, including current and future predicted status), emergency alerts and warning messages (e.g., obtained from an emergency alert system or EAS), and other information that may cause household power consuming devices to alter their respective current draw. Power consumption parameters may be obtained, for example, from the external sources, as well as input by an operator and/or from sensors on the EV and/or home. From these parameters, examples herein may register the parameters and characterize a current and/or future condition that is external of the household power system and may impact the power draw from the grid. Example characterization of situations may include, but are not limited to, currently experienced emergencies that have caused a power outage (e.g., black outs, natural disasters, etc.). As another example situation, embodiments disclosed herein may forecast in which power from the grid may become unavailable or limited (e.g., inclement weather forecasts, such as a hurricane or other natural disaster that may cause a power outage, forecasts of high load on the grid that could cause a power outage, planned blackout, etc.).

Embodiments herein may also provide directed energy savings by taking into account cost of electricity. Examples disclosed herein may obtain costs of electrical power drawn from the grid (e.g., from an energy plan associated with the home, surcharges during peak energy usage, and the like). Based on the costs, embodiments disclosed herein characterize the situation and operate the EV to supply power to the household power system when the costs of electrical power drawn from the grid exceed a threshold cost. This threshold may be set at any desired amount, and may be dynamically set with time of day.

In examples, embodiments disclosed herein can be adapted according to operator preferences, remaining charge on the electric vehicle, weather conditions, etc. For example, an operator may set the various thresholds for triggering the operation of the EV to supply power. In another example, embodiments herein may automatically generate the prioritization list of household power consuming devices in a ranked order, for example, according to power consumption metrics, operating criticality, etc. This list may serve as a recommendation of priority, which the operator may adjust as desired. In another example, an operator may set power reserve limit on the EV, which may serve as a minimum charge to keep in reserve in the vehicle power system to permit operation of the EV as a vehicle (e.g., keep a state of charge in the battery that permits the EV to be driven a set distance, such as 75 miles). The power reserve limit may also be set automatically by the disclosed systems, such as an amount of charge is to be held in a reserve to permit a roundtrip to the nearest hospital or other location (e.g., charging station). Accordingly, operating the EV to supply power to the household power system can be dynamically balanced dependent on a current state of charge (SOC) of the EV.

In some examples, the disclosed technology may leverage ML models trained to identify devices that need electrical power, as well as auxiliary devices, for making suggestions on where to route power. For example, historical data on power consumption and operator behavior (e.g., as gathered by a smart home application or mobile phone connected to the disclosed systems) can be used to train ML algorithms to recognize which household power consuming devices are operated under certain behaviors (e.g., refrigerator is not used after 9:00 PM, A/C is turned off when the temperature is below 70 degrees Fahrenheit, etc.). This knowledge can be used to refine the prioritization of household power consuming devices. For example, while the prioritization list may indicate that the refrigerator is an essential device, if the current time is after 9:00 PM then examples herein may turn off the refrigerator or otherwise cause the refrigerator to not draw power thereto, and prioritize another device over the refrigerator (e.g., a television).

Examples herein may be connected to a smart home platform (e.g., Apple Homekit, Google Home, Amazon Alexa, etc.). Smart home platform may include power meters that measure and provide power consuming metrics (e.g., current draw by appliances and other household consuming devices). Examples herein may query the APIs of a smart home platform to obtain current and/or historical power consumption for devices on the household power system, which can be used to provide the prioritization described above. In some examples, power consumption within the household power system can be obtained on an device-by-device basis, for example, where devices are Internet-of-Things (IoT) devices that can be controlled and interfaced with remotely. In this case, examples herein can activate and deactivate the device itself, thereby controlling power drawn by the device. In some examples, power draw can be measured at outlet and the power drawn by an outlet can be representative of power consumed by connected appliances. In this case, routing power can be done by controlling which outlets power is supplied to.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for carbon footprint aware V2H electrical power distribution can be implemented in other types of vehicle including fuel-cell vehicles, electric vehicles, or other vehicles. Accordingly, reference to an EV in the present disclosure will be understood as referring to any vehicle capable of electrically connecting to and exchanging electrical power with an external electrical power source.

FIG. 1 illustrates a drive system of an example vehicle 100 that may include an internal combustion engine 114 and one or more electric motors 122 (which may also serve as generators) as sources of motive power. Driving force generated by the internal combustion engine 114 and motors 122 can be transmitted to one or more wheels 134 via a torque converter 116, a transmission 118, a transmission input shaft 136, a transmission output shaft 124, a propeller shaft 126 coupled to a differential gear device 128, and a pair of axles 130.

As an HEV, vehicle 100 may be driven/powered with either or both of engine 114 and the motor(s) 122 as the drive source for travel. For example, a first travel mode may be an engine-only travel mode that only uses internal combustion engine 114 as the source of motive power. A second travel mode may be an EV travel mode that only uses the motor(s) 122 as the source of motive power. A third travel mode may be an HEV travel mode that uses engine 114 and the motor(s) 122 as the sources of motive power. In the engine-only and HEV travel modes, vehicle 100 relies on the motive force generated at least by internal combustion engine 114, and a clutch 115 may be included to engage engine 114. In the EV travel mode, vehicle 100 is powered by the motive force generated by motor 122 while engine 114 may be stopped and clutch 115 disengaged.

Engine 114 can be an internal combustion engine such as a gasoline, diesel or similarly powered engine in which fuel is injected into and combusted in a combustion chamber. A cooling system 112 can be provided to cool the engine 114 such as, for example, by removing excess heat from engine 114. For example, cooling system 112 can be implemented to include a radiator, a water pump and a series of cooling channels. In operation, the water pump circulates coolant through the engine 114 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 114. In other applications, either or both the water pump and the fan may be operated by electric current such as from battery 144.

An output control circuit 114A may be provided to control drive (output torque) of engine 114. Output control circuit 114A may include a throttle actuator to control an electronic throttle valve that controls fuel injection, an ignition device that controls ignition timing, and the like. Output control circuit 114A may execute output control of engine 114 according to a command control signal(s) supplied from an electronic control unit 150, described below. Such output control can include, for example, throttle control, fuel injection control, and ignition timing control.

Motor 122 can also be used to provide motive power in vehicle 100 and is powered electrically via a battery 144. Battery 144 may be implemented as one or more batteries or other power storage devices including, for example, lead-acid batteries, nickel-metal hydride batteries, lithium ion batteries, capacitive storage devices, and so on. Battery 144 may be charged by a battery charger 145 that receives energy from internal combustion engine 114. For example, an alternator or generator may be coupled directly or indirectly to a drive shaft of internal combustion engine 114 to generate an electrical current as a result of the operation of internal combustion engine 114. A clutch can be included to engage/disengage the battery charger 145. Battery 144 may also be charged by motor 122 such as, for example, by regenerative braking or by coasting during which time motor 122 operate as generator.

Motor 122 can be powered by battery 144 to generate a motive force to move the vehicle and adjust vehicle speed. Motor 122 can also function as a generator to generate electrical power such as, for example, when coasting or braking. Battery 144 may also be used to power other electrical or electronic systems in the vehicle. Motor 122 may be connected to battery 144 via an inverter 142. Battery 144 can include, for example, one or more batteries, capacitive storage units, or other storage reservoirs suitable for storing electrical power that can be used to power motor 122. When battery 144 is implemented using one or more batteries, the batteries can include, for example, nickel metal hydride batteries, lithium ion batteries, lead acid batteries, nickel cadmium batteries, lithium ion polymer batteries, and other types of batteries.

The battery 144 may provide a high voltage direct current (DC) output. The inverter 142 may provide the ability to bi-directionally transfer energy between the battery 144 and the connected electric components, such as, but not limited to, electronic control unit 150, as well as the motors 122 and other electric machines of various vehicle systems 158 (e.g., lighting systems, display systems, audio/visual systems, etc.). For example, battery 144 may provide a DC voltage while the electronic control unit 150, motors 122, and/or other electric machines may operate with an alternating current (AC) to function. The inverter 142 may convert the DC voltage to an AC current to operate these components. In a regenerative mode, the inverter 142 may convert the AC current from the electric components, such as motors 122 and/or brake systems (not illustrated), acting as generators to the DC voltage compatible with the battery 144 for storage therein.

The vehicle 100 may be configured to recharge the battery 144 from an external power source 146. The external power source 146 may be a connection to an electrical outlet. The external power source 146 may be electrically coupled to a charge station or electric vehicle supply equipment (EVSE) 148. The external power source 146 may be an electrical power distribution network or electrical transmission grid as provided by an electric utility company. The EVSE 148 may provide circuitry and controls to regulate and manage the transfer of energy between the power source 146 and the vehicle 100. The external power source 146 may provide DC or AC electric power to the EVSE 148. The EVSE 148 may have a charger connector 154 for coupling to a charge port 156 of the vehicle 100. The charge port 156 may be any type of port configured to transfer power from the EVSE 148 to the vehicle 100. The charge port 156 may be electrically coupled to charger 145. The charger 145 may condition the power supplied from the EVSE 148 to provide proper voltage and current levels to the battery 144. The charger 145 may interface with the EVSE 148 to coordinate the delivery of power to the vehicle 100. The charger connector 154 may have pins that mate with corresponding recesses of the charge port 156. Alternatively, various components described as being electrically coupled or connected may transfer power using a wireless inductive coupling.

An electronic control unit 150 (described below) may be included and may control the electric drive components of the vehicle as well as other vehicle components. For example, electronic control unit 150 may control inverter 142, adjust driving current supplied to motor 122, and adjust the current received from motor 122 during regenerative coasting and breaking. As a more particular example, output torque of the motor 122 can be increased or decreased by electronic control unit 150 through the inverter 142.

A torque converter 116 can be included to control the application of power from engine 114 and motor 122 to transmission 118. Torque converter 116 can include a viscous fluid coupling that transfers rotational power from the motive power source to the driveshaft via the transmission. Torque converter 116 can include a conventional torque converter or a lockup torque converter. In other embodiments, a mechanical clutch can be used in place of torque converter 116.

Clutch 115 can be included to engage and disengage engine 114 from the drivetrain of the vehicle. In the illustrated example, a crankshaft 132, which is an output member of engine 114, may be selectively coupled to the motor 122 and torque converter 116 via clutch 115. Clutch 115 can be implemented as, for example, a multiple disc type hydraulic frictional engagement device whose engagement is controlled by an actuator such as a hydraulic actuator. Clutch 115 may be controlled such that its engagement state is complete engagement, slip engagement, and complete disengagement complete disengagement, depending on the pressure applied to the clutch. For example, a torque capacity of clutch 115 may be controlled according to the hydraulic pressure supplied from a hydraulic control circuit 140. When clutch 115 is engaged, power transmission is provided in the power transmission path between the crankshaft 132 and torque converter 116. On the other hand, when clutch 115 is disengaged, motive power from engine 114 is not delivered to the torque converter 116. In a slip engagement state, clutch 115 is engaged, and motive power is provided to torque converter 116 according to a torque capacity (transmission torque) of the clutch 115.

As alluded to above, vehicle 100 may include an electronic control unit 150. Electronic control unit 150 may include circuitry to control various aspects of the vehicle operation. Electronic control unit 150 may include, for example, a microcomputer that includes a one or more processing units (e.g., microprocessors), memory storage (e.g., RAM, ROM, etc.), and I/O devices. The processing units of electronic control unit 150, execute instructions stored in memory to control one or more electrical systems or subsystems 158 in the vehicle. Electronic control unit 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 150 receives information from a plurality of sensors included in vehicle 100. For example, electronic control unit 150 may receive signals that indicate vehicle operating conditions or characteristics, or signals that can be used to derive vehicle operating conditions or characteristics. These may include, but are not limited to accelerator operation amount ($A_{CC}$), a revolution speed ($N_E$) of internal combustion engine 114 (engine RPM), a rotational speed ($N_{MG}$) of the motor 122 (motor rotational speed), and vehicle speed ($N_V$). These may also include torque converter 116 output ($N_T$) (e.g., output amps indicative of motor output), brake operation amount/pressure (B), and battery (SOC) (i.e., the charge amount for battery 144 detected by an SOC sensor). Accordingly, vehicle 100 can include a plurality of sensors 152 that can be used to detect various conditions internal or external to the vehicle and provide sensed conditions to engine control unit 150 (which, again, may be implemented as one or a plurality of individual control circuits). In one embodiment, sensors 152 may be included to detect one or more conditions directly or indirectly such as, for example, fuel efficiency ($E_F$), motor efficiency ($E_{MG}$), hybrid (internal combustion engine 114+MG 122) efficiency, acceleration ($A_{CC}$), etc.

In some embodiments, one or more of the sensors 152 may include their own processing capability to compute the results for additional information that can be provided to electronic control unit 150. In other embodiments, one or more sensors may be data-gathering-only sensors that provide only raw data to electronic control unit 150. In further embodiments, hybrid sensors may be included that provide a combination of raw data and processed data to electronic control unit 150. Sensors 152 may provide an analog output or a digital output.

Sensors 152 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect objects in an environment surrounding vehicle 100, for example, traffic signs indicating a current speed limit, road curvature, obstacles, surrounding vehicles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms. For example, example vehicle 100 may also be implemented as a battery electric vehicle (BEV), in which engine 114 may not be present and vehicle operation uses battery 144.

Figure 2:
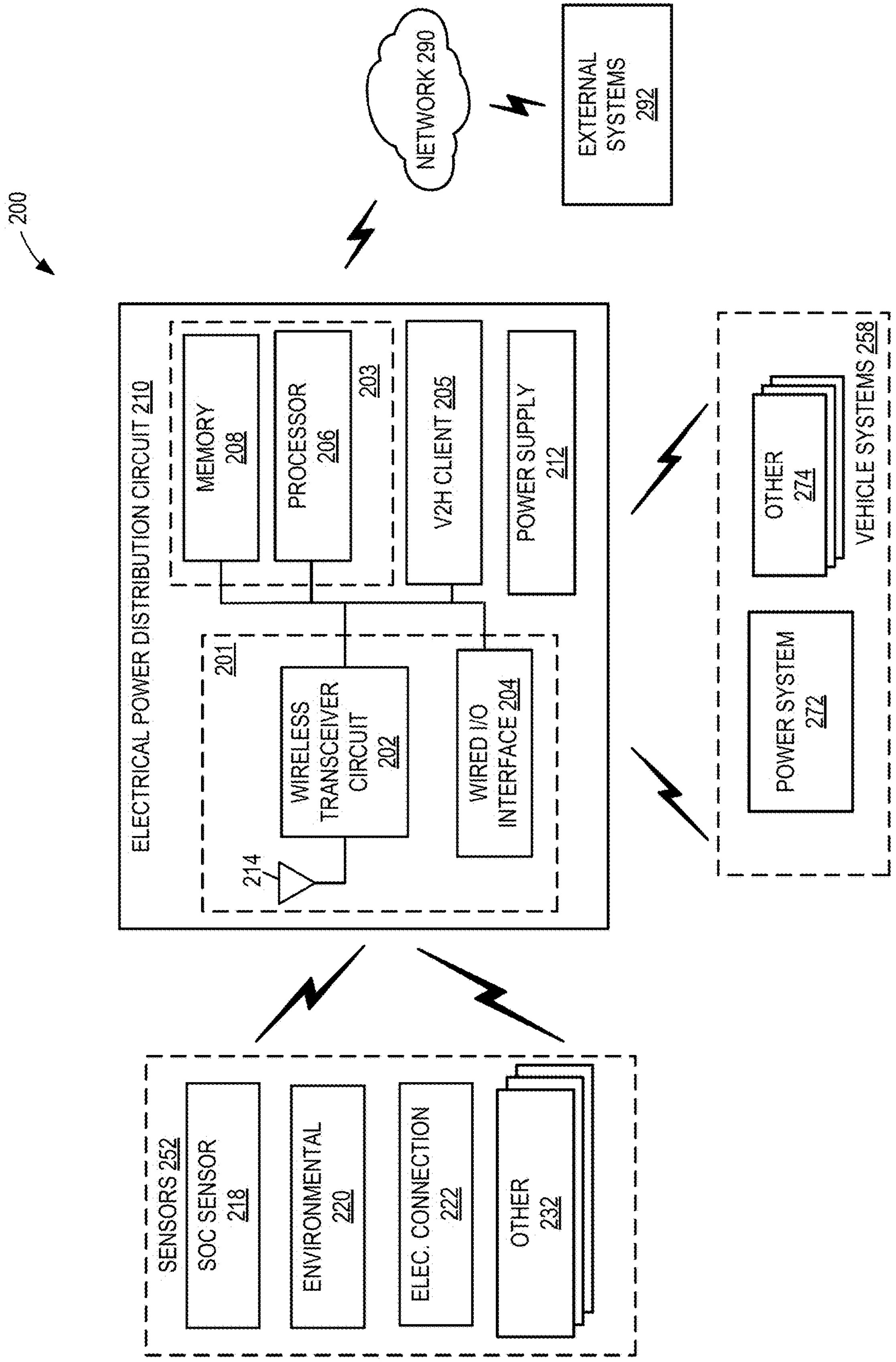
FIG. 2 illustrates an example architecture for carbon footprint aware vehicle-to-home electrical power distribution in accordance with embodiments of the systems and methods described herein.

FIG. 2 illustrates an example architecture for carbon footprint aware V2H electrical power distribution in accordance with embodiments of the systems and methods described herein. Referring now to FIG. 2, in this example, carbon footprint aware electrical power distribution system 200 includes an electrical power distribution circuit 210, a plurality of sensors 252 and a plurality of vehicle systems 258. Sensors 252 (such as sensors 152 described in connection with FIG. 1) and vehicle systems 258 (such as subsystems 158 described in connection with FIG. 1) can communicate with electrical power distribution circuit 210 via a wired or wireless communication interface. Although sensors 252 and vehicle systems 258 are depicted as communicating with electrical power distribution circuit 210, they can also communicate with each other as well as with other vehicle systems. electrical power distribution circuit 210 can be implemented as an ECU or as part of an ECU such as, for example electronic control unit 150. In other embodiments, electrical power distribution circuit 210 can be implemented independently of the ECU.

Electrical power distribution circuit 210 in this example includes a communication circuit 201, a decision circuit 203 (including a processor 206 and memory 208 in this example) and a power supply 212. Components of electrical power distribution circuit 210 are illustrated as communicating with each other via a data bus, although other communication in interfaces can be included. Electrical power distribution circuit 210 in this example also includes V2H client 205 that can be operated to connect to external systems via a network 290 to receive data signals that may be used for distributing electrical power according to the examples herein.

For example, electrical power distribution circuit 210 execute V2H client 205 to query APIs of external systems 292 for information indicative of a carbon footprint of an electrical transmission grid. The information may include information of a current carbon footprint and/or historical carbon footprint. In some examples, the information may comprise may include a measure of the carbon footprint in terms of an amount of greenhouse gases generated by the grid, delineation of how much electric energy is sourced from non-renewable energy sources and/or renewable energy sources, and other metrics that may be used to characterize the carbon footprint. In this example, the external systems queried may be an electric utility company that provides the grid, from governmental agency (e.g., the U.S. Energy Information Administration (EIA) or the like) that collects, analyzes and disseminates energy information, and/or third party systems capable of reporting characterizing and/or forecasting a grid carbon footprint (e.g., WattTime, iOS and the like).

In another example, electrical power distribution circuit 210 execute V2H client 205 to query APIs of household systems, described below in connection with FIG. 3, for power consumption metrics for characterizing power consumption by devices connected to a household power system and power consumption parameters for characterizing situations external to the household power system by recognizing external conditions. The metrics and parameters may be current metrics and parameters characterizing current power consumption in real-time. The metrics and parameters may also include historical metrics and parameters characterizing historical power consumption. The metrics may include, for example but not limited to, measures of power consumption, such as current draw, on a device-by-device basis, as well as outlet-by-outlet basis. Parameters may include, but are not limited to, operating criticality of the power consuming devices that may be used in defining whether or not a particular device can be categorized as essential or non-essential, electricity costs (static or dynamic costs, such as costs as a function of peak demand and/or time), current weather and/or weather forecast (e.g., temperatures, natural disasters, such as tornadoes and hurricanes, etc.), status of the grid (e.g., power load or usage, including current and future predicted status), emergency alerts and warning messages (e.g., obtained from an emergency alert system or EAS), among other parameters. In this example, the external systems queried may include, but are not limited to, systems executing a smart home platform (e.g., Apple Homekit, Google Home, Amazon Alexa, etc.); smart home devices (e.g., IoT devices connected to network 290, such as smart outlets, smart appliances, and the like), an EAS, and weather reporting systems, among others. In some examples, power consumption parameters may be input by an operator via a user device (e.g., a mobile phone, personal computer, tablet, and the like) connected to network 290.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store instructions and variables for processor 206 as well as any other suitable information, such as, one or more of the following elements: information indicative of the grid carbon footprint, power consumption metrics, power consumption parameters, power consuming device prioritization lists, along with other data as needed. Memory 208 can be made up of one or more modules of one or more different types of memory, and may be configured to store data and other information as well as operational instructions that may be used by the processor 206 to electrical power distribution circuit 210. In some examples, memory 208 may include one or more ML models trained to recognize patterns and predict one or more of: a grid carbon footprint, energy usage by power consuming devices, power consumption device priority, and the like.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up a electrical power distribution circuit 210.

Communication circuit 201 includes either or both a wireless transceiver circuit 202 with an associated antenna 214 and a wired I/O interface 204 with an associated hardwired data port (not illustrated). Communication circuit 201 can provide for vehicle-to-everything (V2X) and/or V2V communications capabilities, allowing electrical power distribution circuit 210 to communicate with external devices and systems, such as power consuming devices, smart home platforms, utility company that systems, governmental agency systems, network cloud servers and cloud-based databases, and/or other external systems via network 290. For example, V2X communication capabilities allows electrical power distribution circuit 210 to communicate with edge/cloud servers of a utility company that systems and/or governmental agency system. Electrical power distribution circuit 210 may also communicate with a connected home over V2X communications.

As this example illustrates, communications with electrical power distribution circuit 210 can include either or both wired and wireless communications circuit 201. Wireless transceiver circuit 202 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by electrical power distribution circuit 210 to/from other entities such as sensors 252 and vehicle systems 258.

Wired I/O interface 204 can include a transmitter and a receiver (not shown) for hardwired communications with other devices. For example, wired I/O interface 204 can provide a hardwired interface to other components, including sensors 252 and vehicle systems 258. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply. Power supply 212 may be an example of battery 144 described above with reference to the example of FIG. 1.

Sensors 252 can include, for example, sensors 152 such as those described above with reference to the example of FIG. 1. Sensors 252 can include additional sensors that may or may not otherwise be included on a standard vehicle with which the carbon footprint aware electrical power distribution system 200 is implemented. In the illustrated example, sensors 252 include battery SOC sensor 218 (e.g., to detect SOS of power supply 212), environmental sensors 220 (e.g., to detect salinity or other environmental conditions, such as weather conditions), electrical connection sensor 222 (e.g., to detect electrical connection between a charge port 156 and charger 145). Additional sensors 232 can also be included as may be appropriate for a given implementation of carbon footprint aware electrical power distribution system 200.

Vehicle systems 258, for example, systems and subsystems 158 described above with reference to the example of FIG. 1, can include any of a number of different vehicle components or subsystems used to control or monitor various aspects of the vehicle and its performance. In this example, vehicle power system 272 to control routing and supply of electrical power to other vehicle systems and other vehicle systems 274 (such as, but not limited to, a vehicle positioning system; engine control circuits to control the operation of internal combustion engine 114 and/or motors 122; vehicle display and interaction systems, such as audio systems, display system, dashboard systems, etc.; Advanced Driver-Assistance Systems (ADAS), autonomous or semi-autonomous driving systems, and the like).

In an example, the vehicle power system 272 may be connected to power supply 212 and configured to control power transfer into and out of the power supply 212. For example, vehicle power system 272 may be configured to control recharging of power supply 212 from external power source (e.g., external power source 146) via connection to an electrical outlet (e.g., via a charge station or EVSE 148), as described above in connection with FIG. 1. The vehicle power system 272 may also be configured to control the transfer of power from power supply 212 to operate other vehicle system, as well as receiving energy from other vehicle systems 274, such as from the internal combustion engine, brake system, etc. The vehicle power system 272 may also be configured control bi-directionally transfer of power between the home power network and the power supply 212, as described above in connection with FIG. 1. In an illustrative example, vehicle power system 272 may comprise at least the inverted 142 that provides for bi-directional energy transfer, charger 145, and charge port 156. Vehicle power system 272 may be connected to or comprise battery 144.

Network 290 may be a conventional type of network, wired or wireless, and may have numerous different configurations including a star configuration, token ring configuration, or other configurations. Furthermore, the network 290 may include a local area network (LAN), a wide area network (WAN) (e.g., the Internet), or other interconnected data paths across which multiple devices and/or entities may communicate. In some embodiments, the network may include a peer-to-peer network. The network may also be coupled to or may include portions of a telecommunications network for sending data in a variety of different communication protocols. In some embodiments, the network 290 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, Wi-Fi (infrastructure mode), Wi-Fi (ad-hoc mode), visible light communication, TV white space communication and satellite communication. The network may also include a mobile data network that may include 2G, 4G, 5G, LTE, LTE-V2V, LTE-V2I, LTE-V2X, LTE-D2D, VoLTE, 5G-V2X or any other mobile data network or combination of mobile data networks. Further, the network 290 may include one or more IEEE 802.11 wireless networks.

In some embodiments, the network 290 includes a V2X network (e.g., a V2X wireless network). The V2X network is a communication network that enables entities such as elements of the operating environment to wirelessly communicate with one another via one or more of the following: Wi-Fi; cellular communication including 2G, 4G, LTE, 5G, etc.; Dedicated Short Range Communication (DSRC); millimeter wave communication; etc. As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mmWave) communication; 2G; 4G; 5G; LTE-V2X; 5G-V2X; LTE-Vehicle-to-Vehicle (LTE-V2V); LTE-Device-to-Device (LTE-D2D); Voice over LTE (VOLTE); etc. In some examples, the V2X communications can include V2V communications, Vehicle-to-Infrastructure (V2I) communications, Vehicle-to-Network (V2N) communications or any combination thereof.

During operation, communication circuit 201 can be used to transmit and receive information between electrical power distribution circuit 210 and sensors 252, and between electrical power distribution circuit 210 and vehicle systems 258. Also, sensors 252 may communicate with vehicle systems 258 directly or indirectly (e.g., via communication circuit 201 or otherwise). For example, communication circuit 201 may receive data from sensors 252 and/or systems 258, which can be provided to decision circuit 203. Decision circuit 203 can analyze the sensor data from sensors 252 to and send control signals to vehicle subsystems 258 for operating (e.g., triggering) one or more subsystems (e.g., vehicle power system 272).

Furthermore, communication circuit 201 can be used to obtain information indicative of a grid carbon footprint from external sources, as well as various power consumption metrics and parameters. Electrical power distribution circuit 210 can register this information into memory 208 and execute decision circuit 203 to access and process the information to determine whether to operate (e.g., trigger) the vehicle power system 272 in a manner that supplies electrical power to the household system 294. For example, communication circuit 201 can be used to transmit and receive information between electrical power distribution circuit 210 and external systems 292, such as, information indicative of a grid carbon footprint and stored in memory 208. Electrical power distribution circuit 210 can register this information into memory 208. Decision circuit 203 can then characterize the carbon footprint of the grid from the registered information and compare it to certain criteria stored in memory 208. If the characterization satisfies the criteria, decision circuit 203 may trigger vehicle power system 272 to transfer electrical power from power supply 212 to the household systems 294 via, for example, the charge port 156 and ultimately to the external power source 146. The criteria may be set in advance as a carbon footprint threshold of the grid, such that if the grid carbon footprint characterized from the obtained information exceeds the carbon footprint threshold, electrical power is transferred from the power supply 212 to the household systems 294. Further examples are provided below in connection with FIGS. 3-6.

Figure 3:
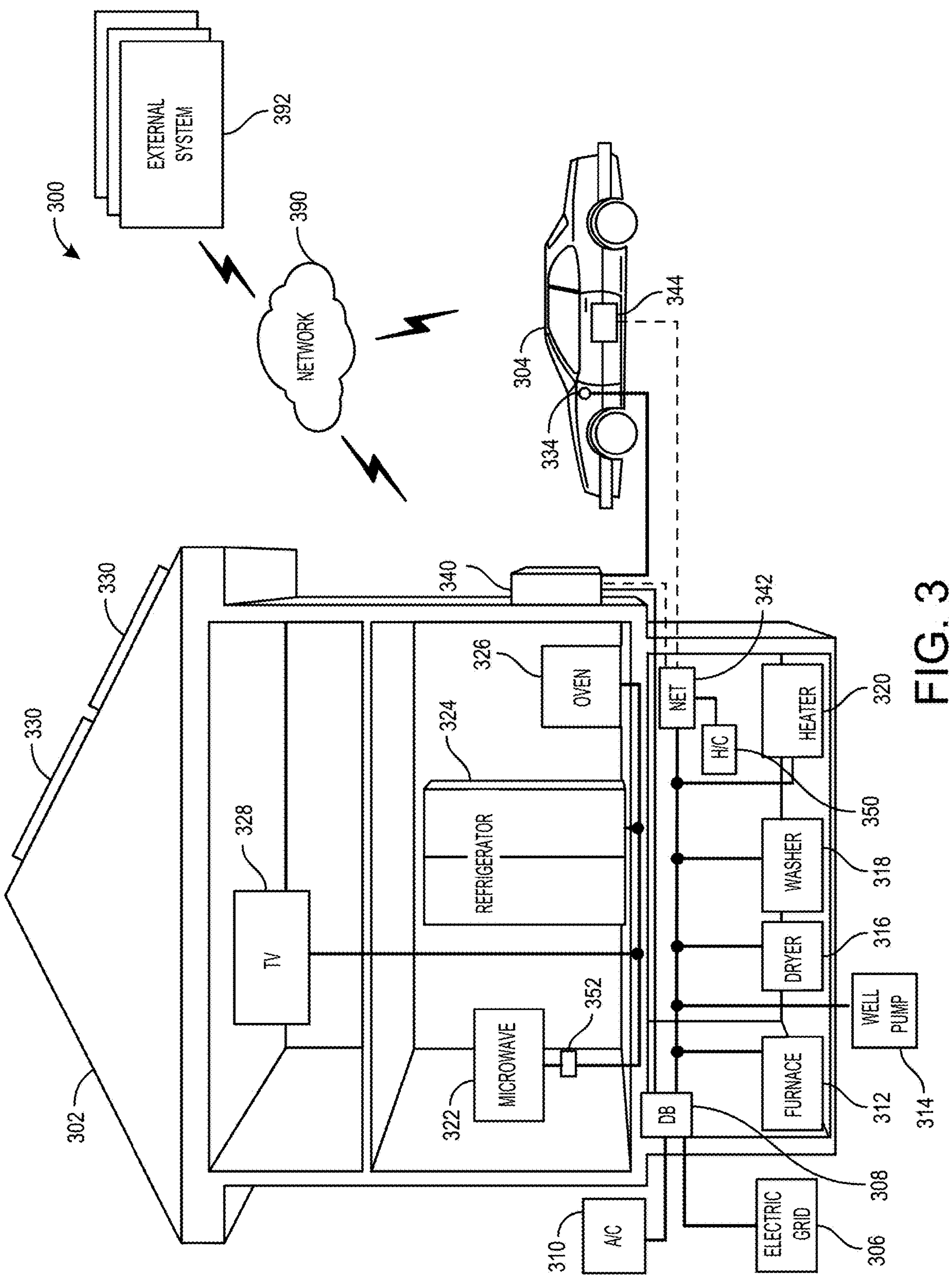
FIG. 3 is a schematic representation of a configuration for transfer of electrical power between a home and a vehicle in accordance with embodiments of the systems and methods described herein.

FIG. 3 depicts an example configuration of a household power system 300. The household power system 300 may include structures/buildings such as, but not limited to, a house 302. The house 302 may be electrically coupled to an electrical transmission grid 306. The grid 306 may be provided by a utility or other company and electrical power may be supplied from a plurality of sources. Electrical power sources may include renewable energy sources (e.g., solar energy sources, wind energy sources, geothermal energy sources, hydropower sources, bioenergy, and the like) or non-renewable energy sources (e.g., oil, natural gas, coal, nuclear energy, and the like). The house 302 may include home power sources, such as solar panels 330, configured to provide power to the house 302 and/or the grid 306. Other home power sources may include a backup generator that runs on natural gas or other fuel.

The home power sources (e.g., solar panels 330) and the grid 306 may be electrically coupled to the home power network through a distribution box 308. The distribution box 308 may provide an attachment point for conductors of the grid 306. The distribution box 308 may further provide connection points for conductors that are routed throughout the house 302 to provide electrical power. The conductors routed through the house may form a home power network. Some conductors may be routed to outlets (e.g., an illustrative outlet 352 is shown in FIG. 3) that are configured to permit household power consuming devices to be plugged into. While the example of FIG. 3 illustrates on outlet 352, this is for illustrative purposes only. Examples herein may include any number of outlets for connecting the home power network device to one or more household power consuming devices. Some conductors may be routed to devices or appliances directly (e.g., hardwired). The distribution box 308 may further include circuit breakers and/or fuses to protect wiring from over-current events. The distribution box 308 may include switches such as a main shut-off switch and/or a transfer switch.

The house 302 and related structures may further include household power consuming devices, such as appliances and other devices, that operate from electrical power drawn from the home power network. For example, the house 302 may include a water heater 320, a washer 318, a dryer 316, a furnace 312, a well pump 314, an air conditioning unit 310, a stove/oven 326, a refrigerator 324, a microwave oven 322, and a television 328. In addition, other appliances and devices without limitation may be connected to the home power network. Household power consuming devices that are connected to the home power network may be also be referred to as household loads. Each of the household power consuming devices may be configured to draw an amount of power from the home power network.

The household power system 300 may further include a charger 340 that is configured to couple the home power network to a vehicle 304. Vehicle 304 may be substantively similar to vehicle 100 described in connection with FIG. 1. The charger 340 may be configured to bi-directionally transfer power between the home power network and the vehicle 304. The charger 340 may include circuitry to convert power between the home power network and the vehicle 304. For example, the home power network may operate using alternating current (AC) power while the vehicle may require a direct current (DC) power. Depending on the transfer direction, the charger 340 may be configured to convert the power to the proper DC or AC specifications. The charger 340 may operate as an example implementation of an EVSE 148 described in connection with FIG. 1. The charger 340 may be directly connected to the distribution box 308. Further, the distribution box 308 may include transfer switches to selectively isolate the power connection between the grid 306 and the charger 340. A charger connection 334 (e.g., charger connector 154 described in connection with FIG. 1) may be installed in a garage to be accessible by the parked vehicle. The charge connecter may be a power cable that is compatible with the charge port (e.g., charge port 156) of the vehicle 304.

The house 302 may include a network router 342 that is configured to establish a home network, such as a local area network (LAN). The home network may be a wired/wireless network. Devices may be connected via a wire Ethernet connection and/or wirelessly. The network router 342 may further include an internet connection such that devices may communicate with other systems via the network 390. The charger 340 may connect to the network router 342 via a wired and/or wireless connection.

The house 302 may include a household controller 350 configured to be in wired or wireless communication with the network router 342. The household controller 350 may be configured to manage operation of the home power network. The household controller 350 may implement one or more of the IoT communication protocols. In addition, the network router 342 may incorporate one or more of the IoT communication protocols. For example, household controller 350 may be implemented as a computing device (e.g., computing component 700) and may comprise a communication circuit (e.g., implemented as an example of communication circuit 201) to allow wired or wireless communications via any of a number of communication protocols. The household controller 350 may serve as a gateway between interfaces to support communication between different interfaces. The home network may include all of the supported interfaces. The household controller 350 may be implemented as a cell phone, tablet, personal computer, central hub or node or the like. In some examples, the household controller 350 may comprise a smart home application installed thereon configured to interface with power consuming devices in the house 302. The smart home application may be configured to activate, de-active, or otherwise control the IoT devices remotely, as well as monitor and track various power consuming metrics of the power consuming devices.

In addition, the vehicle 304 may be configured to communicate with the network router 342 via a controller 344. The controller 344 may be an example implementation of circuit 219 and/or ECU 150. In some configurations, the charge connector may include an Ethernet or wired connection that is routed to the network router 342 via the power cable that connects the vehicle 304 to the charger 340. The vehicle 304 may also establish a wireless connection to the network router 342. For example, the controller 344, implemented as electrical power distribution circuit 210, may be configured to communicate with the network router 342 through a communication circuit (e.g., communication circuit 201).

The vehicle 304 provides an opportunity to export power from the vehicle 304 to the household power system through V2H energy transfer operation. In this mode of operation, power may be transferred from the onboard power sources of the vehicle 304 (e.g., battery 144 and/or power supply 212) to the home power network through the bi-directional energy transfer via charger 340. In an example, electrical power may be supplied by the vehicle power system 372. Electrical power from the vehicle 304 may be used to power the house 302 as supplement power from the grid 306 and/or as substitute for power from the grid 306.

The controller 344 may be configured for energy management. The controller 344 may communicate with the home network via the network router 342 to exchange data with the household power consuming devices and/or household controller 350, thereby integrating vehicle 304 in a home energy management system. The controller 344 may be configured to manage operation of the vehicle power sources and the household power consuming devices to intelligently manage the operation of the home power network.

When the controller 344 is connected to the network router 342, the management of the home power network may be performed individually or distributed between the household controller 350 and the controller 344. In some configurations, the household controller 350 may manage the home power network when the vehicle 304 is not connected to the home power network. In some configurations, when the vehicle 304 is connected to the home power network, control can be passed to the controller 344 of the vehicle 304. In other examples, control can be shared between the controller 344 and controller 350 via exchange of messages communicated through the home network. Operations to be described herein regarding energy management and distribution of energy between the vehicle 304 and the home power network may be applicable to the controller 344 and/or to the household controller 350.

The grid 306 may be provided by a utility or other company and electrical power may be supplied to the grid 306 from a plurality of sources. Electrical power sources may include renewable energy sources, as well as non-renewable energy sources. The grid 306 may be associated with a carbon footprint that is proportional to the amount of electrical power drawn by the grid 306 from non-renewable sources. For example, as larger amounts of electrical power are drawn from non-renewable sources, the value (or index) of the grid's carbon footprint (e.g., in terms of tonnes of emissions ($CO_2$-equivalent) per unit of comparison) increases. The carbon footprint of the grid 306 may be based on direct emission (e.g., carbon emissions emitted by the grid 306 itself) and indirect emissions (e.g., emissions from sources upstream and downstream of the grid 306). In this case, renewable and non-renewable energy sources may be examples of indirect emissions.

In the example of FIG. 3, household power system 300 may be configured to communicate with external systems 392 via network 390. External systems 392 may publish information indicative of the carbon footprint of the grid, which can be obtained by household power system 300. For example, external systems 292 may publish carbon footprint values (or indices) in terms of an amount of greenhouse gases, as measured by tonnes of emissions ($CO_2$-equivalent) per unit of comparison, emitted by the grid, including direct and/or indirect sources. The measured values may be published as a current measure of the carbon footprint and/or as time-series data of historical measures along a past time horizon to a current time. In another example, external systems 292 may publish a delineation of how much (e.g., percentage or other comparative values) electric energy on the grid 306 is drawn from non-renewable energy sources and/or how much electrical power is drawn from renewable energy sources. The delineation may be broken down into categories of non-renewable and renewable, or further into the individual sources (e.g., a measure for an amount drawn from oil, an amount drawn natural gas, an amount drawn from solar, an amount drawn from wind, etc.). The delineation may be also be published as a current amount and/or as time-series data of historical measures. In either case, household power system 300 may query an API operating on the external systems 392 to obtain the information. For example, the household controller 350 and/or controller 344 may interface with the API and obtain the information indicating of the grid's carbon footprint from the external sources.

The home energy management system, via the controller 344 and/or controller 350, may be configured to manage operation of the vehicle power system to offset the carbon footprint of the grid, for example, by supplying electrical power to the house 302 from the vehicle 304 based on (e.g., responsive too) the carbon footprint of the grid satisfying certain criteria. The system 300 may be configured to reactively offset the carbon footprint through current real-world information, from which the system 300 (e.g., controller 350 and/or controller 344) can characterize a current carbon footprint of the grid 306. In another example, system 300 may be configured to proactively offset the carbon footprint by predicting a future carbon footprint of the grid from historical information. Carbon emission savings may be realized as the vehicle may be able to supply electrical power to the house 302 instead of from the grid 306 in a case of high non-renewable energy draw or otherwise high carbon footprint. Further carbon savings can be realized through balancing the power demand by prioritizing household power consumption devices over others, as described below. In addition, the system 300 can realize costs savings through knowledge of costs for drawing power from the grid 306 (e.g., obtained from energy plans, knowledge of peak energy usage periods, etc.) and leveraging the vehicle power system during times of high power costs.

Criteria for triggering the switch over from power drawn from the grid 306 to electrical power drawn from the vehicle 304 can be set within the household power system 300, for example, in controller 350 and/or 344. The criteria may comprise a carbon footprint threshold that can be compared to the characterization of the carbon footprint of the grid 306. For example, the system 300 (e.g., controllers 350 and/or 344) operate to obtain information indicative of the carbon footprint of the grid 306 from external systems 392. The system 300 can characterize the carbon footprint by one or more of registering a current (e.g., most recent) information indicative of the carbon footprint and/or by predicting a future carbon footprint from historical data. If the characterization of the carbon footprint exceeds the carbon footprint threshold, the household power system 300 may trigger operation of the vehicle power system of vehicle 304 to supply electrical power to the household energy network.

The carbon footprint threshold may be based on the type of information used to characterize the grid's carbon footprint. For example, the carbon footprint threshold may be set as a value of an acceptable value of carbon footprint. In this case, the characterized carbon footprint may be a current or predicted value determined from the information obtained from the external systems 292 and, if the characterization exceeds the value, the vehicle 304 can be operated to supply electrical power to the household energy network. In another example, the threshold may be provided as an amount of electrical power drawn by the grid 306 (e.g., a percentage or other comparative value) from non-renewable energy sources and/or an amount sourced from renewable energy sources. In this case, the characterized carbon footprint may be provided as a delineation of a current or predicted comparative amounts of electrical power drawn from renewable and non-renewable power sources. In one example, if the amount of electrical power drawn by the grid 306 from non-renewable energy sources exceeds the threshold amount, the vehicle 304 can be operated to supply electrical power to the household energy network. Said another way, if the amount of electrical power drawn by the grid from renewable energy sources is equal to or below the threshold amount, the household energy network may draw electrical power from the grid 306. The above functionality may be performed by controller 350 and/or controller 344. In the case of controller 350, instructions to switch to the vehicle power system for supplying electrical power to the house 302 may be communicated to controller 344, which may then operate the vehicle power system of vehicle 304 accordingly.

In some examples, the home energy management system may be configured to manage operation of the household power consuming devices to balance the power demand of the household power consuming devices, for example, by prioritizing certain devices over others. By balancing the power demand, the vehicle power system may be adapted so to handle different predicted and/or current load levels.

One or more of the household power (including, but not limited to, outlets 352) consuming devices may be IoT devices that can be configured to communicate with the controller 350 via network router 342. For example, the household power consuming devices may include a wired and/or wireless communication interface for connecting to the network router 342. The household power consuming devices may communicate via one or more predetermined communication protocols. The household power consuming devices may be programmed to transmit data on the home network including power consumption metrics. The power consumption metrics, in an illustrative example, may be current draw by a respective household power consuming devices. The household power consuming devices may transmit the metrics for the associated device to other modules. The household power consuming devices may transmit a runtime parameter associated with the metrics to other modules. The runtime parameter may be an operating time of the household power consuming devices correlated with the metrics at each time point (e.g., time-series data). For example, the refrigerator 324 may have a predicable runtime based on a time of day (e.g., day or night). In some cases, the runtime may be dynamically generated by the respective device or may be a predicted or estimated value by controller 350 and/or 344 via a trained ML model operating on historical runtimes.

The household power consuming devices may support various IoT communication protocols and standards. For example, the household power consuming devices may be configured to communicate via, but not limited to, a Bluetooth interface, a Zigbee protocol, a Z-Wave interface and protocol, etc. The household controller 350 (or controller 344) may query an API operating on a respective household power consuming device to obtain power consumption metrics.

Based on the obtained metrics, controller 350 (or controller 344) may be configured to manage operation of the home power network. For example, the controller 350 may execute a smart home application that controls and monitors power consumption metrics of connected devices by collecting the metrics and runtime parameters of the connected devices.

Other devices or modules may transmit system messages on the home network. For example, some household power consuming devices may be configured to transmit interior and exterior temperature, time, day of week, current weather conditions, forecasted weather conditions, etc. The household power consuming devices may include one or more sensors configured to provide an indication of occupancy of the home. Such data may be used by other modules for control decisions. For example, the signals may be used to predict when devices may be activated. This may be useful for load scheduling and balancing. As another example, the motion sensor may be positioned throughout house 302 and configured to detect occupants in certain rooms or areas of house 302. Based on detecting the presence of someone within a room or area, household power consuming devices in that room or area may draw electrical power from the vehicle power system, while unoccupied rooms may draw power from grid 306.

The household power consuming devices may be prioritized based on operating criticality. Each of the household power consuming devices may have an associated operating criticality. The operating criticality may be stored locally in the household power consuming devices or externally in a controller (e.g. household controller 350 or controller 344). The households power consuming loads may be ranked in an ordered list according to operating criticality, for example, from most critical to least critical. In some cases, the prioritization of devices may be based on current and/or predicted power consumption metrics, for example, devices having higher current or predict current draw may be ranked higher than devices having lower current draw. In some cases, the operating criticality may be adjusted by the home owner via a user interface accessing the controller 350. Some household power consuming devices may be categorized (e.g., labeled) as essential loads, for example, the top ranked k loads in the prioritized list, where k is an integer greater than zero. Essential loads may include loads for which power may not be interrupted (e.g., reduced to zero current) without consequence. For example, the refrigerator 324 and A/C 322 may be categorized as essential loads in the event of an emergency in which there is a power outage on the grid 306. Some loads may be categorized as non-essential loads. These loads may be interrupted for a period of time without consequence.

Controller 350 (or controller 344) may be configured to predict future power consumption metrics (e.g., future current draw) from the historical metrics and runtime parameters. For example, from historical metrics and runtime parameters for the refrigerator 324, the controller may be able to predict low future current draw during the night (e.g., when the refrigerator 324 will not be opened frequently) and a high future current draw during the day (e.g., high usage of refrigerator 324). The controller may then adjust the operating criticality of the refrigerator 324 to rank the refrigerator 324 higher during the day than at night. As another example, the controller may obtain weather forecast data from an external system (or from a household power consuming device) and predict a future high current draw for the A/C 310 based on increased exterior temperatures. The controller may then adjust the operating criticality of the A/C 310 to be higher for the time period corresponding to the increased temperature. As yet another example, the controller may obtain weather forecast data and predict a natural disaster (e.g., hurricane or other storm that could cut of power draw form the grid) and categorize certain devices as essential for survival during a power outage (e.g., refrigerator 324).

The controller (e.g., controller 350 and/or controller 344) may also characterize external conditions from power consumption parameters. Power consumption parameters may include, but are not limited to, operating criticality of household power consuming devices (as described above), as well as electricity costs (static or dynamic costs, such as costs as a function of peak demand and/or time and costs as defined in an electricity plan), current weather and/or weather forecast (e.g., temperatures, natural disasters, such as tornadoes and hurricanes, etc.), power load on the grid 306, and other information that may cause household power consuming devices to alter their respective current draw. Power consumption parameters may be obtained, for example, from the external systems queried may be a controller.

In some examples, the controller (e.g., controller 350 and/or 344) may comprise ML algorithms trained to predict household power consuming devices that may need electrical power for making suggestions on where to route power. For example, historical power consumption metrics, parameters, and behavior by residents of the home correlated with the historical metrics and parameters can be used to train an ML algorithm to recognize which household power consuming devices are operated under certain resident behaviors (e.g., refrigerator is not used after 9:00 PM, A/C is turned off when the temperature is below 70 degrees Fahrenheit, etc.). The controller can leverage this knowledge to refine (e.g., reorder) the ranking of household power consuming devices. For example, while refrigerator 324 may be an essential device during an emergency, if the current time is after 9:00 PM then the controller lower the prioritization of the refrigerator 324 so that it does not draw power from the home power network.

In some examples, the ranking of household power consuming devices may be manually adjusted according to user input via a user interface connected to controller 350. For example, an operator may be able to override a priority ranking of the household power consuming devices. For example, lights may be ranked lower in priority, but an operator may prefer that these lights be ranked higher to categorize the lights as essential.

During operation, the controller (e.g., controller 350 and/or 344) may determine to supply electrical power to the house 302 using the vehicle power system based on a carbon footprint of the grid 306, as described above. Additionally, in some embodiments, once the controller has determined to leverage the vehicle power system, the controller may leverage the prioritization of household power consuming devices, as set forth in the ranked list, to balance the power demand on the vehicle power system by using the vehicle power system to supply power to a portion of the home power network (e.g., route electrical power to only a subset of household power consuming devices labeled as essential loads, while the remaining household power consuming devices draw from the grid). For example, the controller may select the top k power consuming devices categorized as essential under a current or predict situation. The controller may then leverage the vehicle power system of vehicle 304 to supply power to the essential loads, while non-essential devices can be continue to draw from the grid 306 or be interrupted.

Figure 4:
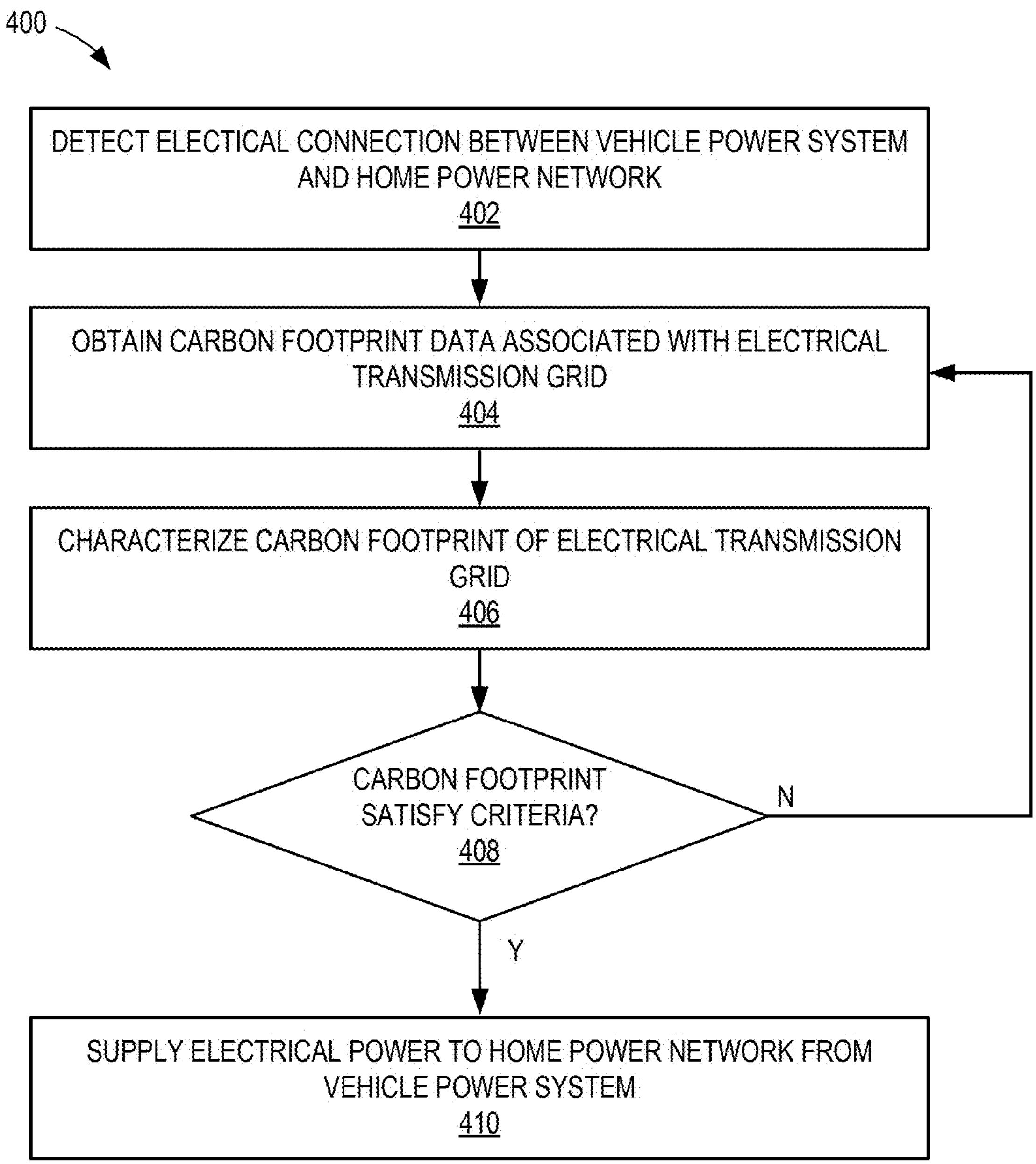
FIG. 4 is a flow chart illustrating example operations for carbon aware power distribution in accordance with various embodiments disclosed herein.

FIG. 4 is a flow chart illustrating example operations for carbon aware V2H power distribution in accordance with various embodiments disclosed herein. FIG. 4 depicts process 400 for supplying power to home power network, as the home power network described above in connection with FIG. 3, from a vehicle power system. Process 400 may be implemented as instructions, for example, stored on a controller (e.g., vehicle controller 344 and/or household controller 350), that when executed by one or more processors perform one or more operations of process 400. The process 400 will be described below with reference to FIG. 3 as an illustrative example. However, one skilled in the art will appreciate that the embodiments disclosed herein are not to be limited to this implementation only.

At operation 402, an electrical connection between a vehicle power system and a home power network is detected. For example, a vehicle (e.g., vehicle 304) can be connected to a home power network of a house (e.g., house 302). As described above, a charge connecter may be electrically coupled to a charge port (e.g., charge port 156) of the vehicle 304. Through this connection, the vehicle power system (e.g., vehicle power system 272) can be connected to a home power network. Detecting the connection may be, for example, performed through a transfer of energy between the two systems, in either direction.

Upon detecting the connection, carbon footprint data associated with an electrical transmission grid (e.g., information indicative of the carbon footprint) connected to the home power network can be obtained at operation 404. For example, the home power network may be connected to an electrical transmission grid (e.g., grid 306) that is configured to supply power to the home power network. Operation 404 may comprise querying external systems, such as a system operated by a utility company and/or governmental agency (e.g., the U.S. Energy Information Administration (EIA) or the like), for carbon footprint data.

As discussed above, the electrical transmission grid may draw power from one or more power sources, such as renewable and/or non-renewable power sources. The carbon footprint of the grid may be proportional to the amount of electrical power drawn by the grid from non-renewable sources. Accordingly, in some examples, the carbon footprint data may be obtained as current and/or historical values of the grid's carbon footprint (e.g., in terms of tonnes of emissions ($CO_2$-equivalent) per unit of comparison). In another example, the carbon footprint data may include a delineation of how much (e.g., percentage or other comparative values) electric energy the grid currently draws or historically drew from non-renewable energy sources and/or renewable energy sources. In some examples, the delineation may be broken down into comparative values of the various sources (e.g., oil, natural gas, solar, wind, etc.).

As alluded to above, the carbon footprint data may also be obtained as time-series data. As such, the carbon footprint data obtained at operation 404 may include information indicative of a current carbon footprint of the grid, as well as information indicative of the historical carbon footprint.

At operation 406, a carbon footprint of the electrical transmission grid can be characterized from the data obtained at operation 404. For example, an estimate of the carbon footprint of the grid can be derived from the carbon footprint data obtained at operation 404. In an illustrative example, in the case where the carbon footprint data is provided as values of a measured carbon footprint, the characterization may be provided as the most recent value, which can be considered a estimate of the carbon footprint moving forward in time. In another example, in the case where the carbon footprint data is provided as a delineation of an amount of power drawn from different power sources, the characterization may be provided as the most recent amount of power drawn from a particular power source (e.g., an amount drawn from non-renewable power sources). In some examples, a prediction of a future carbon footprint can be estimated from historical carbon footprint data, for example, by application of a ML model trained to recognize patterns in historical data and infer a future carbon footprint.

At operation 408, the characterized carbon footprint is compared to criteria. If the characterized carbon footprint satisfies the criteria, the vehicle power system can be used to supply power to the home power network at operation 410 (e.g., from a power supply 212 and/or battery 144 on the vehicle). Otherwise, the process 400 returns to operation 404 and is repeated. In some examples, if the determination at operation 408 is negative, the home power network continues to draw power from the electrical transmission grid.

Operation 408 may comprise comparing the carbon footprint characterized at operation 406 against a carbon footprint threshold, as an example criteria, set in advance. For example, as described above in connection with FIG. 3, if the carbon footprint characterized at operation 406 exceeds the carbon footprint threshold, the determination at operation 408 may be affirmative and, responsive to this determination, the vehicle power system can be operated to supply electrical power to the home power network.

In an illustrative example, the carbon footprint threshold may be set as value of an acceptable measure of carbon footprint. In this case, if the characterization of the carbon footprint (e.g., provided as a value) is greater than the threshold value, process 400 proceeds to operation 410. The threshold value may be set at any desired value of carbon footprint. In an example, the threshold may be zero (e.g., net zero greenhouse gases emitted by power sources souring the grid).

In another example, the carbon footprint threshold may be provided as an amount of power drawn by the grid (e.g., a percentage or other comparative value) from non-renewable energy sources (and/or an amount sourced from renewable energy sources). In this case, if the amount of power drawn by non-renewable energy sources characterized at operation 406 exceeds the threshold amount (or, said another way, the amount of power supplied by renewable energy is below the threshold), process 400 proceeds to operation 410. The threshold amount may be set at any desired amount of power drawn from non-renewable or renewable power sources. In one example, if any power is sourced from non-renewable power sources, the determination at operation 408 is affirmative. In another example, 50% may be used as a threshold amount.

In some examples, the amount of electrical power supplied by the vehicle power system at operation 410 may be inversely proportional to the amount of power on the grid sourced from renewable power sources (e.g., as more power is sourced from renewable power sources and less from non-renewable power sources, less power is pulled from the EV).

Figure 5:
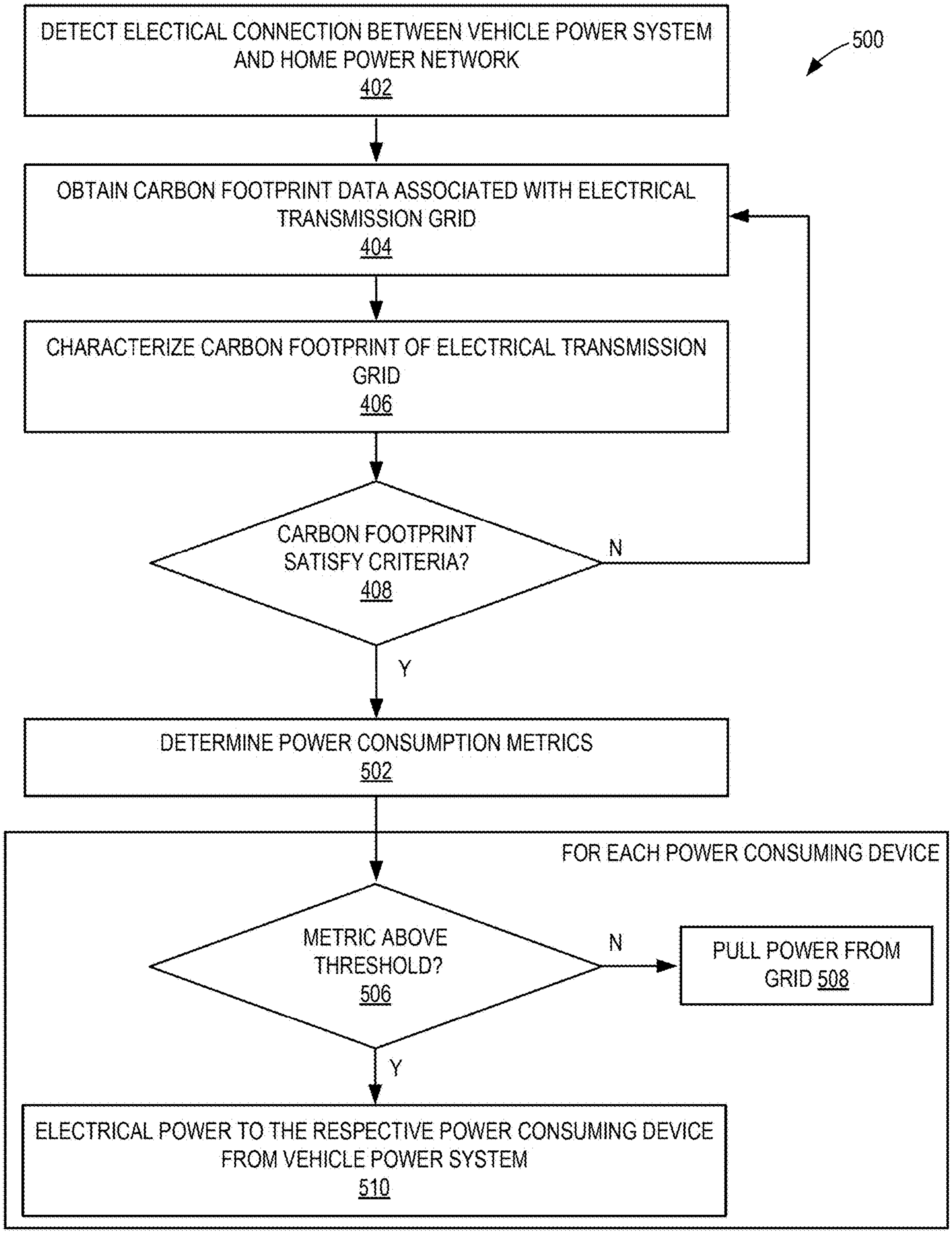
FIG. 5 is a flow chart illustrating additional example operations for carbon aware power distribution in accordance with an embodiment disclosed herein.

FIG. 5 is a flow chart illustrating example operations for carbon aware V2H power distribution in accordance with one embodiment. FIG. 5 depicts process 500 that can provide for directed carbon savings by supplying power to home power network, as the home power network described above in connection with FIG. 3, from a vehicle power system. Process 500 may be implemented as instructions, for example, stored on a controller (e.g., vehicle controller 344 and/or household controller 350), that when executed by one or more processors perform one or more operations of process 500.

Process 500 includes operations 402-408 of process 400 as described above in connection with FIG. 4. Accordingly, process 500 can operate the vehicle power system to supply electrical power the home power network based on a characterization of the carbon footprint of the electrical transmission grid. Additionally, process 500 may operate to route electrical power from the vehicle power supply to a portion of the home power network (e.g., subset of household power consuming devices), while permitting the remainder of the home power network to draw power from the grid (e.g., grid 306), thereby providing directed carbon footprint savings through balancing power loads.

More particularly, at operation 502, power consumption metrics can be obtained that are associated with the home power network. For example, power consumption metrics (e.g., current draw) can be obtained for one or more household power consuming devices. In examples, the power consumption metrics can be obtained for each outlet (e.g., outlet 352) in the home. In another example, a smart home application can be queried to obtain power consumption metrics for each of the one or more household power consuming device. While operation 502 is illustrated following operation 408, this is only for example purposes. Operation 502 can be performed at any point earlier in process 500, for example, in tandem with any one or more of operations 404-408. In some examples, power consumption metrics can be current metrics (e.g., real-world current draw at current point in time), which can inform real-world, current operations of the devices. In another example, power consumption metrics may be provided as historical metrics (e.g., historical current draw of a past time horizon). In the case of historical metrics, operation 502 may execute a ML model trained to recognize patterns from the historical metrics and predict a future power consumption metric.

At operation 506, the power consumption metrics (actual or predicted) can be compared to a metric threshold on a device by device basis. For a given device, if the associated power consumption metric is greater than the metric threshold, then electrical power can be supplied to the respective device from the vehicle power system at operation 510. For example, electrical power can be routed to an outlet connected into which the respective device is connected (e.g., routed on the basis of outlets). In another example, electrical power can be routed to the respective device, without knowledge of the specific outlet to which the device is connected. Otherwise, if the determination at operation 506 is negative, the device can draw power from the grid at operation 508. The metric threshold may be provide as any desired value for the power consumption metric that delineates between high draw devices (e.g., such as refrigerators, air conditioners, and so on) and low draw device (e.g., LED lamps). Accordingly, process 500 can route electrical power from the vehicle power system to a subset of household power consuming devices in a directed and intelligent manner.

Figure 6:
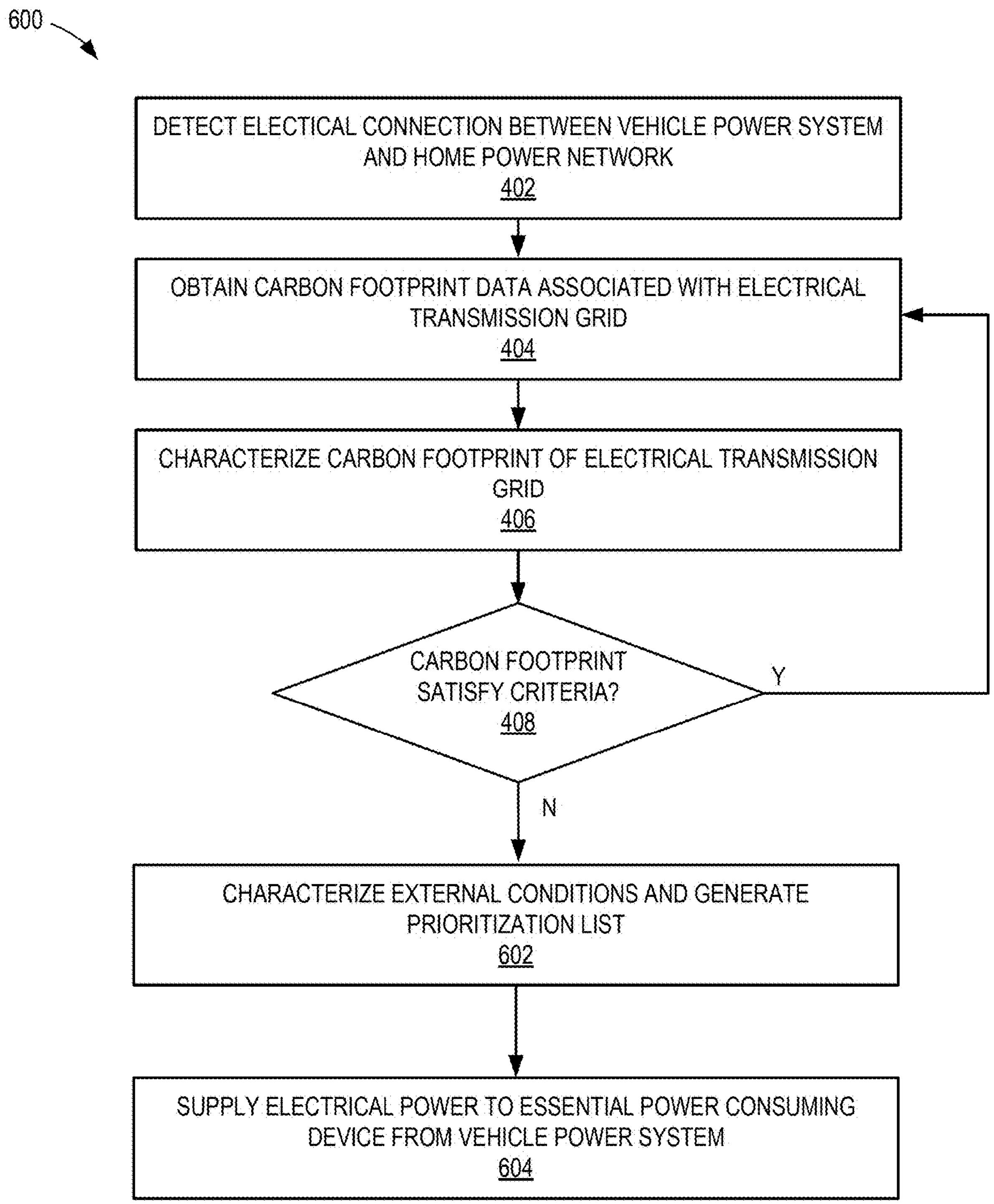
FIG. 6 is a flow chart illustrating example operations for carbon aware power distribution in accordance with another embodiment disclosed herein.

FIG. 6 is a flow chart illustrating example operations for carbon aware V2H power distribution in accordance with another embodiment. FIG. 6 depicts process 600 that can provide for prioritized routing of power to home power network, as the home power network described above in connection with FIG. 3, from a vehicle power system according to various situations. Process 600 may be implemented as instructions, for example, stored on a controller (e.g., vehicle controller 344 and/or household controller 350), that when executed by one or more processors perform one or more operations of process 600.

Process 600 includes operations 402-408 of process 400 as described above in connection with FIG. 4. Accordingly, process 600 can operate the vehicle power system to supply electrical power the home power network based on a characterization of the carbon footprint of the electrical transmission grid. Additionally, process 600 may operate to route electrical power from the vehicle power supply to a prioritized portion of the home power network (e.g., subset of household power consuming devices), while permitting the remainder of the home power network to draw power from the grid (e.g., grid 306), thereby providing directed savings. In some examples, the prioritized routing may take current or predicted external conditions into account when prioritizing devices.

More particularly, at operation 602, an external condition can be characterized. For example, external conditions can be characterized by obtaining power consumption parameters, such as but not limited to, electricity costs (static or dynamic costs, such as costs as a function of peak demand and/or time), current weather reports and/or weather forecasts, status of the electrical transmission grid (e.g., power outages, high usage or load, etc.), emergency alerts and warning messages (e.g., obtained from an emergency alert system or EAS), and the like. From these parameters, operation 602 may ingest the information and characterize a condition that is external of the home power network, but may impact the power draw from the grid. For example, operation 602 may characterize an situation as high electricity costs based on electricity costs estimated, for example, from an energy plan associated with the house, high grid usage or load, and the like. In another example, operation 602 may characterize an emergency situation, for example, based on emergency alerts and warning messages and/or power outage on the grid. In some examples, operation 602 may predict a future situation that may negative impact power supplied by the grid, for example, due to inclement weather currently occurring or forecasted in the future.

In some examples, operation 602 may leverage an ML model trained to predict future situations (e.g., emergencies, power outages, high electricity costs, or other situations that may negatively impact the supply of power to the home) from historical parameters.

Operation 602, or separate operation, may also include generating a prioritization list according to operating criticality of a plurality of household power consuming devices. Each of the household power consuming devices may have an associated criticality. The households power consuming loads may be ranked in an ordered list according to operating criticality, for example, from most critical to least critical. In some examples, the criticality of devices may be based on current and/or predict power consumption metrics, for example, devices having higher current or predict current draw may be ranked higher than devices having lower current draw. In another example, a default criticality may be associated with each device according to a recognized criticality for safe human habitation (e.g., a refrigerator may be more critical to survival than a television). In some cases, the operating criticality may be adjusted by the operator of the home according to user preferences.

While operation 602 is illustrated following operation 408, this is only for example purposes. Operation 602 can be performed at any point earlier in process 600, for example, in tandem with any one or more of operations 404-408.

In an example, if operation 602 characterizes a situation that may negatively affect the availability of power from the grid (e.g., emergencies, power outages, high electricity costs, or other situations that may negatively impact the supply of power to the home), then process 600 proceeds to operation 604 where electrical power is routed from the vehicle power system to only the essential household power consuming devices. For example, a top k ranked devices from the prioritization list may be categorized (e.g., labeled) as essential loads and the remaining devices categorized as non-essential loads, where k is an integer greater than zero. The integer for k may be set as desired by an operator. Accordingly, in this example, the vehicle power system can be leverage to supply power to essential devices, while the non-essential device receive power from the grid (if any).

In another example, operation 604 may not be dependent on characterizing a situation. Said another way, operation 602 need not characterize a situation. Thus, at operation 608, irrespective of the external conditions, power can be supplied from the vehicle power system to only the essential devices.

In some embodiments, the amount of power supplied by the vehicle power system may be limited according to a set limit, which may be static or dynamically set. For example, a power reserve limit for the vehicle power system may be set within the examples disclosed herein and the amount of electrical power drawn from the vehicle power system can be limited based on the power reserve limit. That is, for example, power may be drawn from the vehicle power system until the current SoC of the battery of the vehicle power system reaches the power reserve limit. In some examples, an operator may set power reserve limit (e.g., in controller 350 and/or 344) as a minimum power to permit operation of the vehicle as a vehicle (e.g., keep a state of charge in the battery that permits the EV to be driven a set distance, such as 75 miles). In another example, the power reserve limit may be set dynamically and automatically, such as an amount of charge is to be held in a reserve to permit a roundtrip to a desired location or landmark (e.g., the nearest hospital, gas station, etc.). In this case, localization coordinates of the vehicle and designated landmark can be used resolve this the distance and compute a power reserve limit. Referring to the examples, in FIGS. 4-6, this power reserve limit may be implemented in operations 410, 510, and/or 604.

Figure 7:
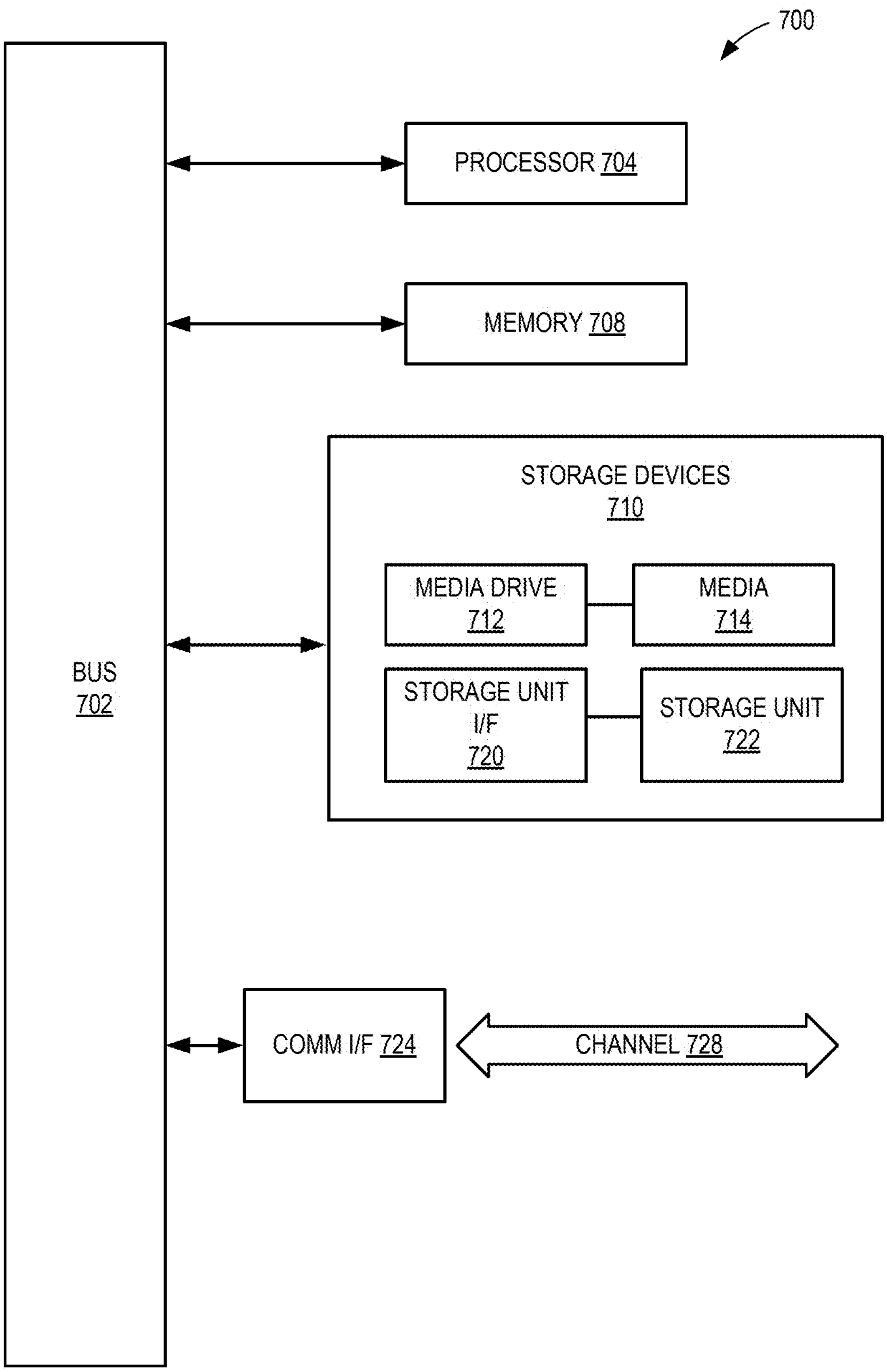
FIG. 7 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. This can include a processor, and/or any one or more of the components making up ECU 150 of FIG. 1; carbon footprint aware electrical power distribution system 200 of FIG. 2; and/or controller 344, controller 350, and/or any household power consuming device of FIG. 3. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. The main memory 708 may store instructions to be executed by processor 704 for performing one or more operations described, for example, in connection with FIGS. 4-6. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or soft modem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 722, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:

electrically connecting a vehicle power system to a household power system, the household power system being connected to an electrical transmission grid;

determining an amount of power drawn by the electrical transmission grid from non-renewable energy sources;

ranking loads of the household power system according to a criticality metric, wherein the criticality metric comprises at least one of:

a power consumption metric, a criticality for safe human habitation metric, or a personal criticality metric configured by a user of the household power system, wherein the personal criticality metric reflects a personal importance of a respective load to the user; and responsive to a determination that the amount of power drawn by the electrical transmission grid from the non-renewable energy sources is greater than a threshold amount, supplying electrical power from the vehicle power system to the household power system, wherein supplying the electrical power from the vehicle power system to the household power system comprises only supplying the electrical power to a subset of the loads based on the criticality metric rankings.

2. The method of claim 1, further comprising:

obtaining, from external systems, information indicative of the amount of power drawn by the electrical transmission grid from the non-renewable energy sources, wherein determining the amount of power drawn by the electrical transmission grid from the non-renewable energy sources is based on the obtained information.

3. The method of claim 2, wherein the obtained information comprises historical information indicative of the amount of power drawn by the electrical transmission grid from the non-renewable energy sources, and wherein determining the amount of power drawn by the electrical transmission grid from the non-renewable energy sources comprises predicting a future amount of power drawn by the electrical transmission grid from the non-renewable energy sources from the historical information.

4. The method of claim 1, wherein ranking the loads of the household power system according to the criticality metric comprises:

ranking the loads according to the criticality for safe human habitation metric to determine the subset of the loads; and ranking the subset of the loads according to the power consumption metric wherein supplying power from the vehicle power system to the household power system comprises only supplying the electrical power to a second subset of the loads within the subset of the loads based on the power consumption metric rankings.

5. The method of claim 4, further comprising determining the power consumption metric for the subset of the loads by performing one or more of: sensing current draw by the subset of the loads from the household power system and estimating a future power draw by the subset of the loads.

6. The method of claim 1, further comprising:
characterizing external conditions based on parameters external to the vehicle power system,
wherein supplying power from the vehicle power system to the household power system is based on the external conditions.

7. The method of claim 6, wherein the parameters external to the vehicle power system comprise one or more of: electricity costs of power drawn from the electrical transmission grid, an emergency, weather conditions, weather forecast, and status of the electrical transmission grid.

8. The method of claim 1, further comprising:
limiting an amount of electrical power supplied by the vehicle power system to the household power system based on a power reserve of the vehicle power system.

9. The method of claim 1, wherein the non-renewable energy sources comprise at least one of:
nuclear energy;
oil;
natural gas; or
coal.

10. A vehicle-to-home electrical power distribution system, comprising:
memory storing instructions; and
one or more processors communicably coupled to the memory and configured to execute the instructions to:
detect an electrical connection between vehicle power system of a vehicle and a household power system of a home, the household power system being connected to an electrical transmission grid;
determine an amount of power drawn by the electrical transmission grid from non-renewable energy sources;
rank loads of the household power system according to a power consumption metric; and
responsive to a determination that the amount of power drawn by the electrical transmission grid from the non-renewable energy sources is greater than a threshold amount, supply electrical power from the vehicle power system to the household power system, wherein supplying the electrical power from the vehicle power system to the household power system comprises only supplying the electrical power to a subset of the loads based on the power consumption metric rankings.

11. The vehicle-to-home electrical power distribution system of claim 10, wherein the one or more processors are further configured to execute the instructions to:
obtain, from external systems, information indicative of the amount of power drawn by the electrical transmission grid from the non-renewable energy sources,
wherein determining the amount of power drawn by the electrical transmission grid from the non-renewable energy sources is based on the obtained information.

12. The vehicle-to-home electrical power distribution system of claim 11, wherein the obtained information comprises historical information indicative of the amount of power drawn by the electrical transmission grid from the non-renewable energy sources, and wherein determining the amount of power drawn by the electrical transmission grid from the non-renewable energy sources comprises predicting a future amount of power drawn by the electrical transmission grid from the non-renewable energy sources from the historical information.

13. The vehicle-to-home electrical power distribution system of claim 10, wherein the one or more processors are further configured to execute the instructions to:
rank the loads of the household power system according to a criticality metric, wherein the criticality metric comprises at least one of:
a criticality for safe human habitation metric, or
a personal criticality metric configured by a user of the household power system, wherein the personal criticality metric reflects a personal importance of a respective load to the user;
wherein supplying power from the vehicle power system to the household power system comprises only supplying the electrical power to a second subset of the loads within the subset of the loads based on criticality metric rankings.

14. The vehicle-to-home electrical power distribution system of claim 10, wherein the one or more processors are further configured to execute the instructions to:
characterize external conditions based on parameters external to the vehicle power system,
wherein supplying power from the vehicle power system to the household power system is based on the external conditions.

15. The vehicle-to-home electrical power distribution system of claim 10, wherein the one or more processors are further configured to execute the instructions to:
limit an amount of electrical power supplied by the vehicle power system to the household power system based on a power reserve of the vehicle power system.

16. The vehicle-to-home electrical power distribution system of claim 10, wherein the non-renewable energy sources comprise at least one of:
nuclear energy;
oil;
natural gas; or
coal.

17. The vehicle of claim 7, wherein the non-renewable energy sources comprise at least one of:
nuclear energy;
oil;
natural gas; or
coal.

18. A vehicle comprising:
one or more batteries configured to supply electrical power to one or more vehicle subsystems;
a charge port configured to electrically couple to a charger and transfer electrical power from the charger to the one or more batteries;
an inverter configured for bi-directional energy transfer between the one or more batteries and the one or more vehicle subsystems; and
an electrical power distribution circuit comprising one or more processors configured to execute instructions stored in memory to:
detect an electrical connection between the charger and the charge port, wherein the charger is connected to a home power network that draws power from an electrical transmission grid;
obtain information indicative of an amount of power drawn by of the electrical transmission grid from non-renewable energy sources;
rank loads of the home power network according to a criticality metric, wherein the criticality metric comprises at least one of:
a power consumption metric,
a criticality for safe human habitation metric, or
a personal criticality metric configured by a user of the household power network, wherein the personal criticality metric reflects a personal importance of a respective load to the user; and responsive to a determination that that amount of power drawn by of the electrical transmission grid from non-renewable energy sources exceeds a threshold amount, operate the inverter to transfer electrical energy from the one or more batteries to the charger via the charge port and direct a vehicle-to-home electrical power distribution system to distribute the electrical energy to a subset of the loads of the home power network based on the criticality metric rankings.

19. The vehicle of claim 18, wherein the obtained information comprises historical information indicative of the amount of power drawn by the electrical transmission grid from non-renewable energy sources, and wherein operating the inverter to transfer electrical energy from the one or more batteries to the charger via the charge port is responsive to predicting a future amount of power drawn by the electrical transmission grid from non-renewable energy sources from the historical information.

* * * * *